Nov. 17, 1953 E. HEGEDÜS 2,659,193
TWISTING DEVICE
Filed March 23, 1949 12 Sheets-Sheet 1

INVENTOR.
EDE HEGEDUS
BY
ATTORNEY.

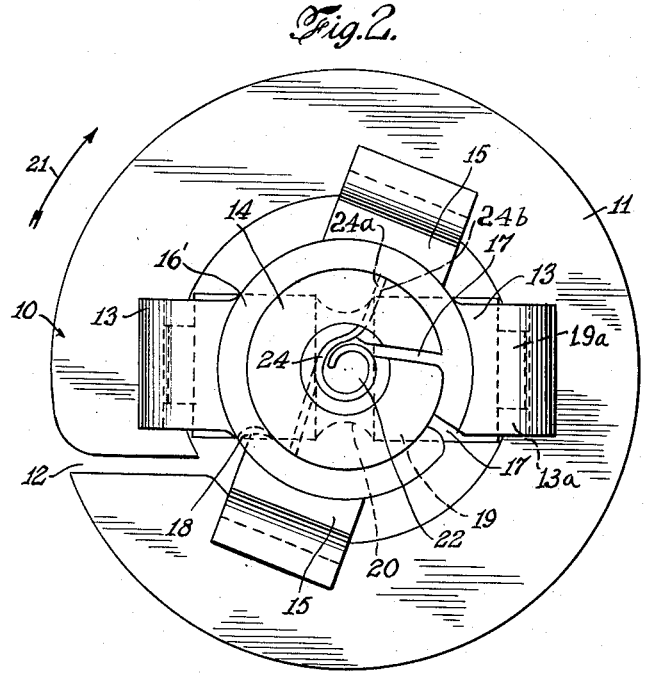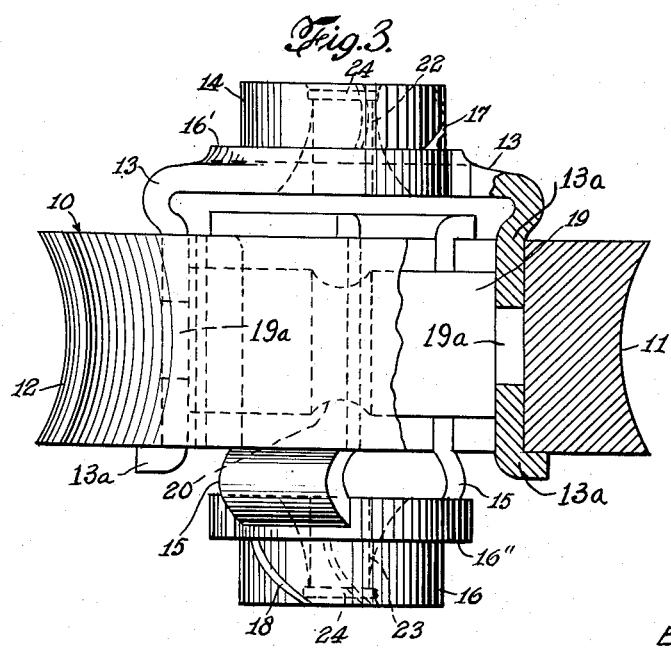

Nov. 17, 1953  E. HEGEDÜS  2,659,193
TWISTING DEVICE
Filed March 23, 1949  12 Sheets-Sheet 3

INVENTOR.
EDE HEGEDUS
BY
ATTORNEY.

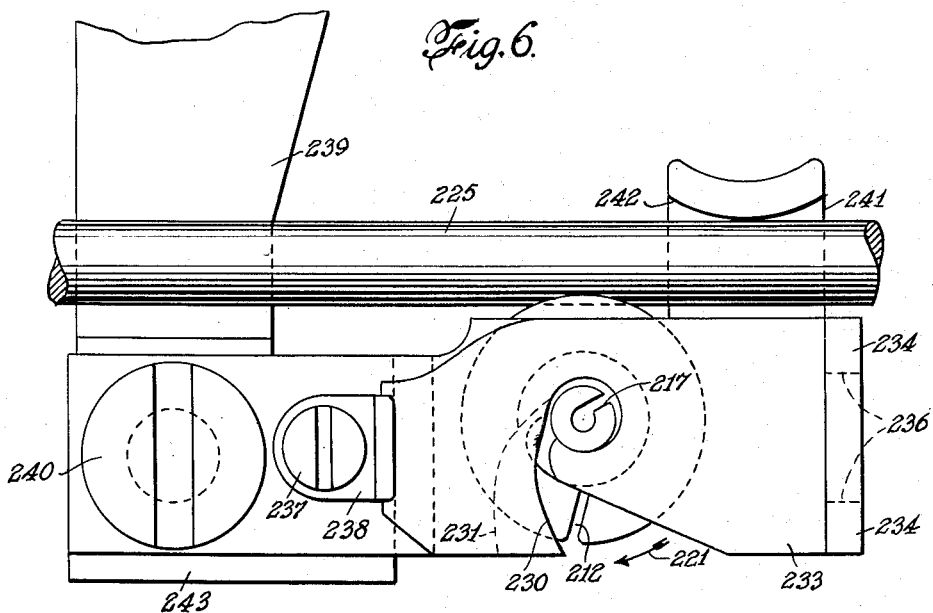
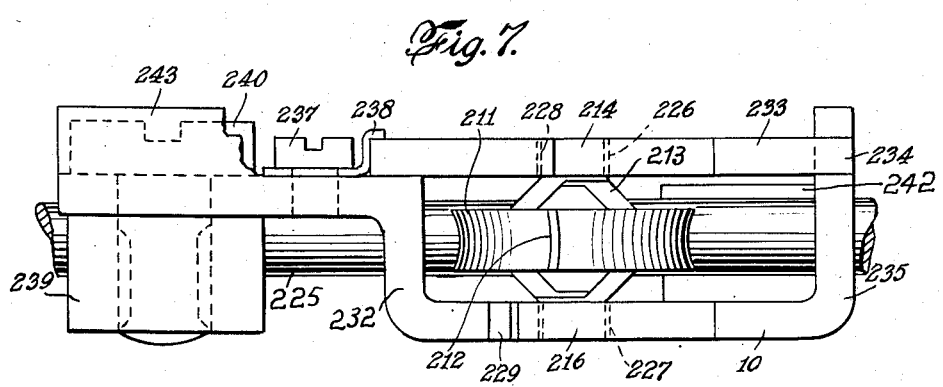

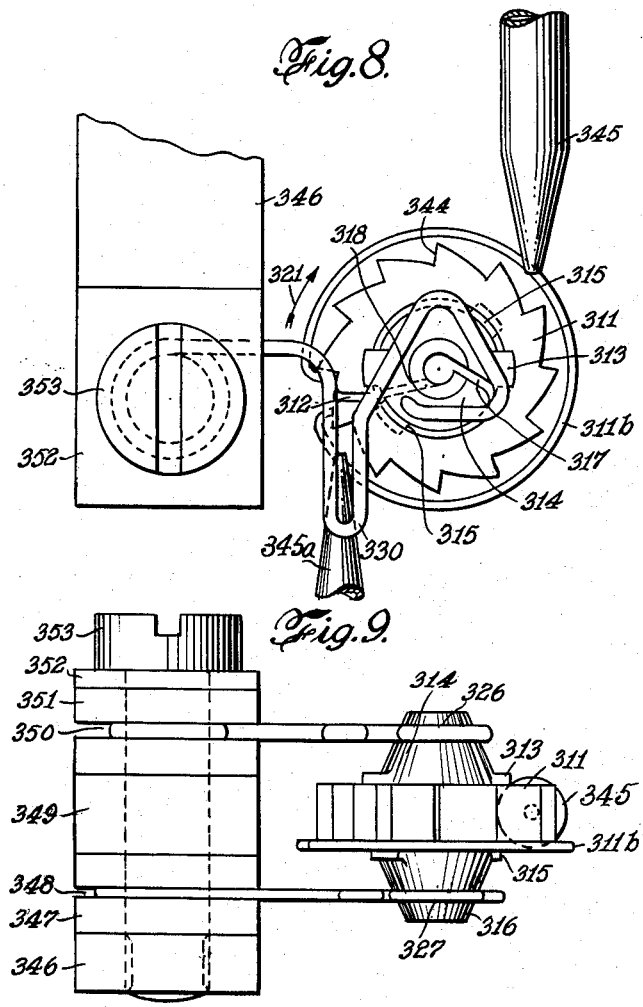

Nov. 17, 1953  E. HEGEDÜS  2,659,193
TWISTING DEVICE
Filed March 23, 1949  12 Sheets-Sheet 6

INVENTOR.
EDE HEGEDÜS
BY
ATTORNEY.

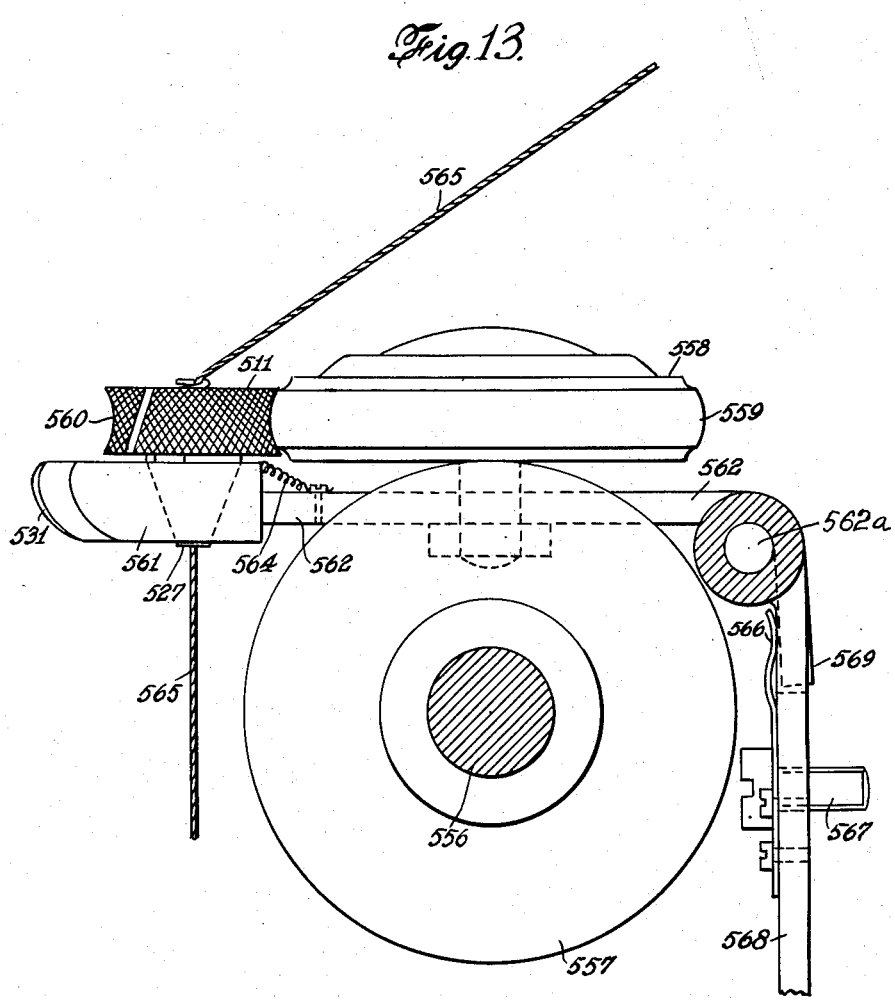

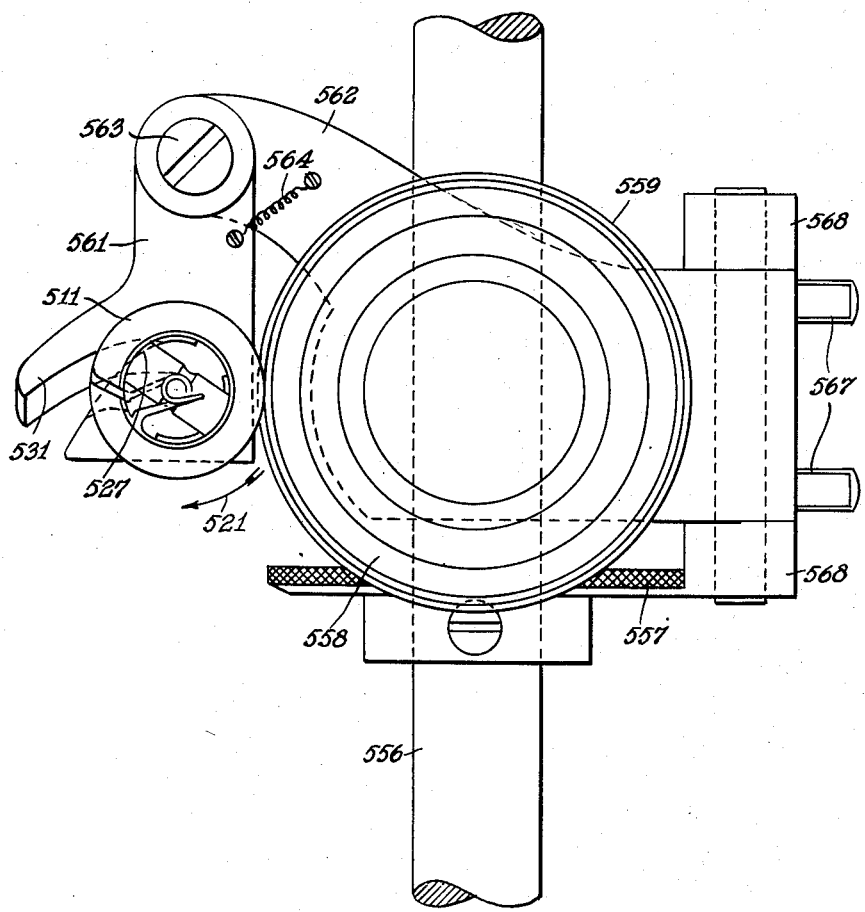

Nov. 17, 1953  E. HEGEDÜS  2,659,193
TWISTING DEVICE
Filed March 23, 1949  12 Sheets-Sheet 9
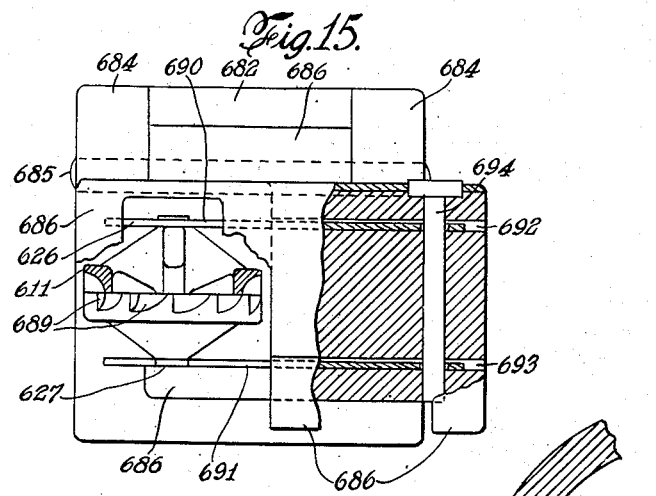
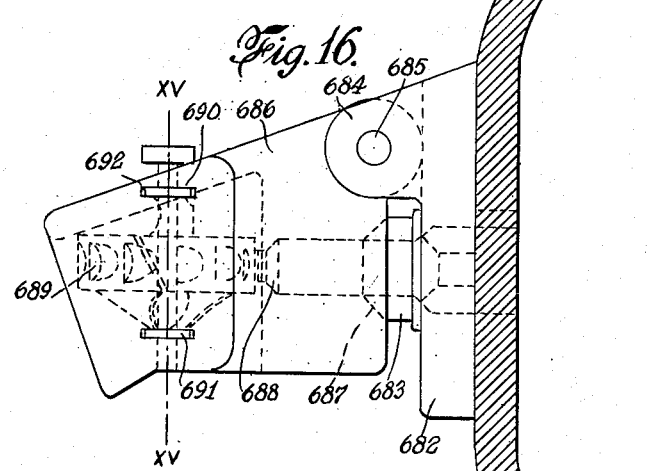
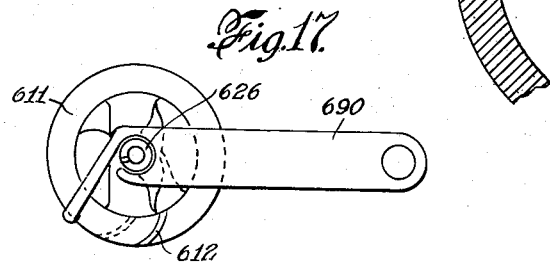
INVENTOR.
EDE HEGEDUS
BY
ATTORNEY.

Nov. 17, 1953

E. HEGEDÜS 2,659,193

TWISTING DEVICE

Filed March 23, 1949

INVENTOR.
EDE HEGEDUS
BY
ATTORNEY.

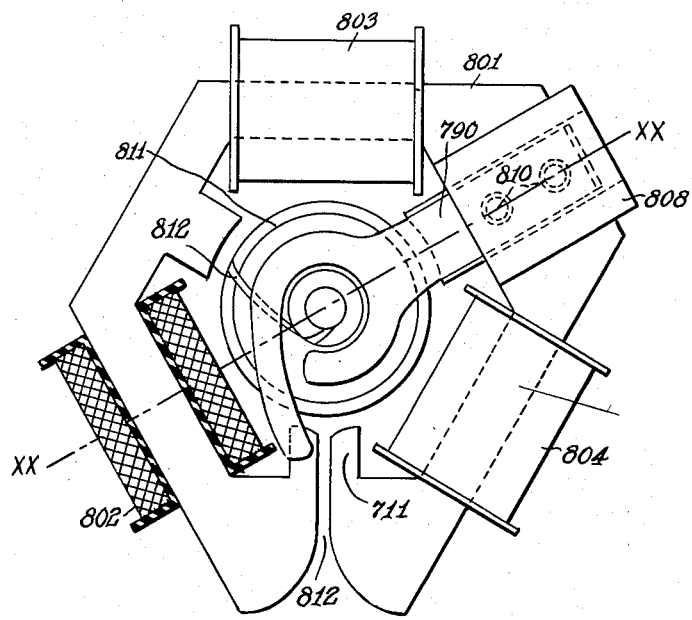
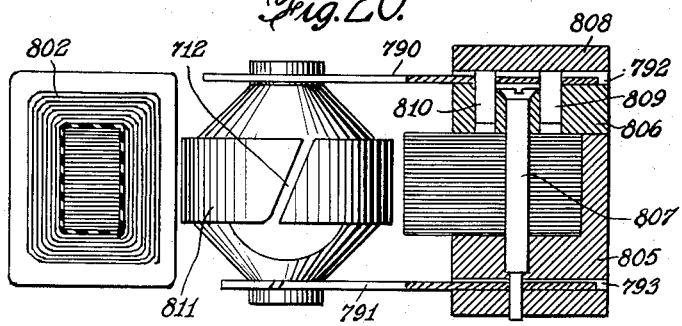

Nov. 17, 1953  E. HEGEDÜS  2,659,193
TWISTING DEVICE
Filed March 23, 1949  12 Sheets-Sheet 12
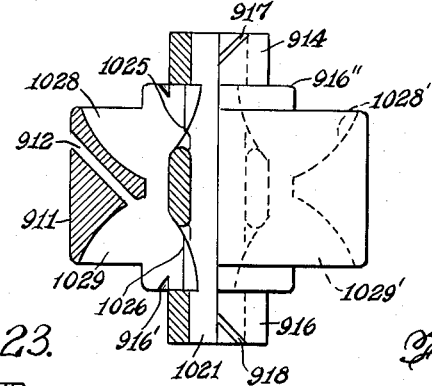
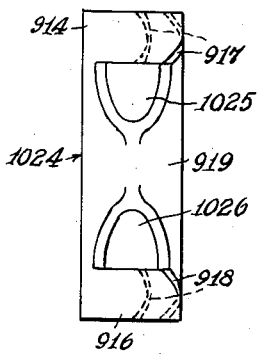
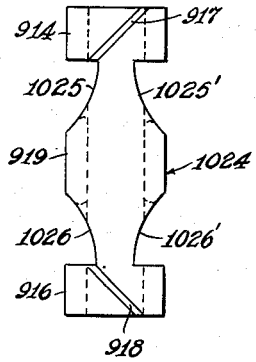
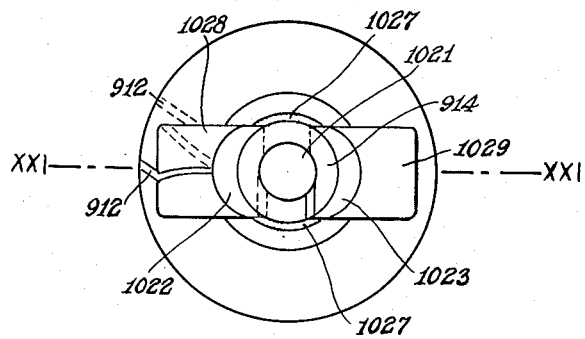
INVENTOR.
EDE HEGEDUS
BY
ATTORNEY.

Patented Nov. 17, 1953

2,659,193

UNITED STATES PATENT OFFICE 2,659,193

TWISTING DEVICE

Ede Hegedüs, Zurich, Switzerland, assignor, by mesne assignments, to The Warner & Swasey Company, Cleveland, Ohio Application March 23, 1949, Serial No. 82,986

Claims priority, application Hungary June 23, 1948

22 Claims. (Cl. 57—77.33)

The present invention relates to a device for imparting a false twist to yarn, thread or the like, e. g. in connection with a spinning operation.

My co-pending patent application Serial No. 991, now Patent No. 2,557,104 which issued June 19, 1951, discloses a twisting device comprising a laterally slotted twisting member, bearing means for the twisting member, having at least one laterally open section, and driving means located in such a manner as to leave free the passage through the said open setcion of the bearing, wherein the surfaces of the slit of the twisting member and those of the open section of the bearing form a passage for the laterally introduced twistable material during the rotation of the twisting member, while the outer surface of the twisting member is constructed in such a manner that only the lateral slit is adapted to take with the twistable material in the prescribed direction of the twisting member, so that the twistable material can be introduced laterally into the twisting member even while it is rotating at a speed of the order of 10,000 to 15,000 R. P. M.

In the constructional forms particularly described in the above mentioned patent application, the surface of the twisting member upon which the frictional resistance of the bearing is active is of substantially the same diameter as the portion to which the driving force is applied for rotating the member. This is an unfavorable construction from the point of view of frictional resistance and the power required to drive the twisting member.

An object of the present invention is to provide a construction that is more favorable from the above mentioned viewpoint. In accordance with the invention, the twisting member has zones or portions of substantially different diameters comprising at least one zone of lesser diameter providing journal surfaces and a zone of larger diameter on which the driving force preferably acts.

It will be understood that such a construction of the twisting member provides a more favorable ratio of the moments of the driving force and of the frictional resistance. This construction is particularly suitable where the twisting member is driven by a penumatic or electromagnetic drive.

The twisting member, as well as the bearing and driving means for the said member, is constructed and arranged in conformity with my above mentioned co-pending patent application, so that the twistable material can be introduced laterally while the twisting member is rotating at high speed.

In order to prevent the laterally introduced twistable material from becoming wound around the bearing, and to insure its passage through the open section of the bearing into the interior of the twisting member, there is provided, in accordance with the present invention, at least one guiding surface which leads to the open section of the bearing and intersects the surface generated by the twistable material as it is carried around with the slit of the rotating twisting member in its farthest position from the axis of the twisting member. This guiding surface cooperates with the rotary guiding surface of the slit of the twisting member to form a passage through which the laterally introduced twistable material can travel during the rotation of the twisting member without becoming jammed between the said guiding surfaces. The said guiding surface leading to the open section of the bearing thus ensures that the yarn, having entered the slit of the twisting member during the rotation of the latter travels along the guiding surface formed by the wall of the slit in the zone having a larger diameter and through the opening of the bearing into the slit of the journalled zone or zones having a lesser diameter and thus to its twisting position.

In the following description, the guiding surface leading to the open section of the bearing is designated as a "stationary" guiding surface, as distinguished from the "rotary" guiding or directing surfaces formed by the slit or slits and other elements in the twisting member. It is obvious, however, that the said guiding surface may, for example, be the rotating outer surface of a roller, in which case the said guiding surface is "stationary" only from the point of view that it does not rotate with the twisting member about the axis of the latter.

The invention will be more fully understood from the following description and claims in conjunction with the accompanying drawings, in which Fig. 1 is a diagrammatic view illustrating how the yarn is guided into twisting position.

Fig. 2 is a plan of an embodiment of a twisting member in accordance with the invention.

Fig. 3 is a view partially in elevation and partially in section of the embodiment of Fig. 2.

Figs. 6 and 7 are a plan view and a side view, respectively, of a twisting device comprising a twisting member according to any of the Figs. 2 to 5 and driven by means of a cord or belt.

Figs. 8 and 9 show in plan and side elevation, respectively, a twisting device provided with a twisting member according to any of the Figs. 2 to 5 and having a pneumatic drive.

Fig. 10 shows in plan a detail of this embodiment.

Figs. 13 and 14 show in elevation and plan, respectively, another frictionally driven embodiment of the twisting device according to Figs. 11 and 12, together with the driving mechanisms.

Fig. 15 is a front view, partly in section, on the line XV—XV of Fig. 16, of a further constructional example of the twisting device and twisting member adapted to be used with it, respectively.

Fig. 16 is a side elevation of the same.

Fig. 17 is a plan view of a detail of the device.

Figs. 19 and 20 show an electrodynamically driven constructional example of the twisting device, Fig. 19 being a plan view and Fig. 20 a section generally according to the line XX—XX of Fig. 19.

Fig. 21 is a view partially in front elevation and partially in section on the line XXI—XXI of Fig. 22, of a further constructional example of the twisting member.

Fig. 22 is a top plan view, and Figs. 23 and 24 are two side elevations at right angles to one another showing the tube forming the shaft of the twisting member.

Figure 1:
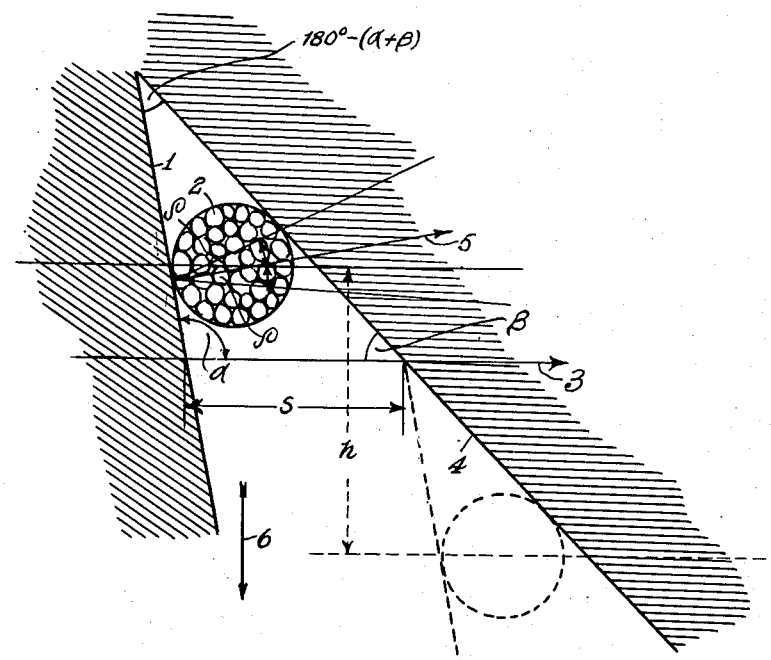
Fig. 1 illustrates diagrammatically the conditions of movement and of jamming of the yarn in the simplest case, when the "rotary" and "stationary" guiding surfaces, which are simultaneously in contact with the yarn, are directly above one another and are bounded by sharp corners.

The "rotary" guiding surface element 1 representing, in a greatly magnified view, a wall of a twisting member, e. g. the wall of the slit 212 or that of the bridge 213 in the twisting member 211 of Fig. 6, which rotates about an axis perpendicular to the plane of the drawing and passing through a center located in the direction of the arrow 6.

Figure 12:
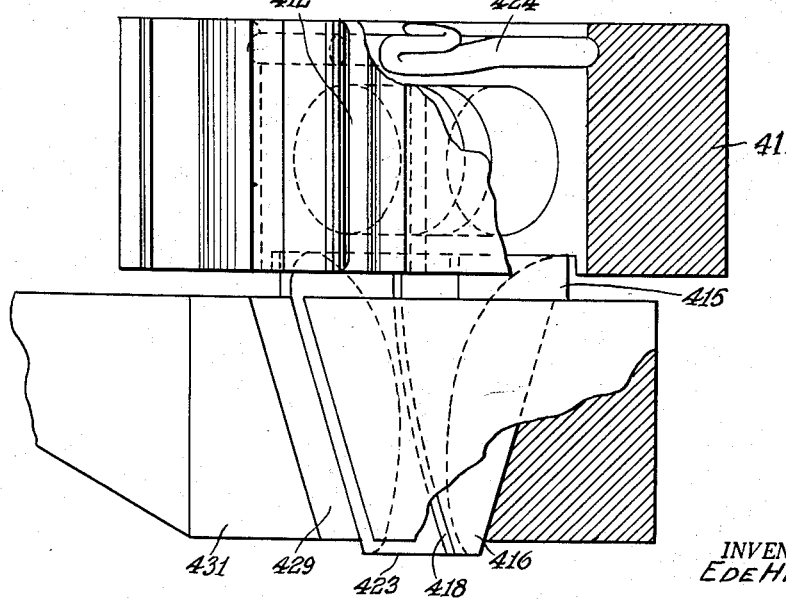

The instantaneous direction of movement of the surface element is indicated by the vector 3 (Figs. 1, 12). The yarn 2 is positioned between the "rotary" surface element 1 and "stationary" surface element 4 arranged immediately above one another, the two elements thus being in different planes like the blades of a pair of shears. The "stationary" surface element may belong, for example, to the surface 230 in Fig. 6. Because of the rotation of the surface 1, a force indicated theoretically by the vector 5 will act upon the yarn. Due to friction, however, the actual direction of the force is to the left or the right of the vector 5 within the angle of friction $\rho$. In order that the yarn will not become jammed and sheared, it is necessary that the direction of the actual force acting upon the yarn should form an angle with the surface 4 which is greater than the angle of friction. Consequently, if $\alpha$ is the angle between the surface 1 and the vector 3 and $\beta$ is the angle between the surface 4 and vector 3, as shown in Fig. 1, it is necessary that the angle $180°-(\alpha+\beta)$ be greater than the angle of friction, and preferably greater than twice the angle of friction. A further criterion for the construction of the said surfaces is that the relation between the displacement S of the surface 1 and the displacement $h$ of the yarn toward the center of the twisting member is:

$$h = \frac{\sin \alpha \sin \beta}{\sin (\alpha+\beta)} \cdot S$$

Naturally, if the guiding or directing surfaces acting upon the yarn are not immediately above one another or if their edges are rounded off, or if the yarn is subjected simultaneously to an external force, or if there are more than two guiding surfaces, the circumstances of the forces and of the movements will be different from the circumstances illustrated diagrammatically in Fig. 1. However, on the basis of the foregoing, favorable guiding surfaces can be constructed.

If the edges of the guiding surfaces adjacent to one another are rounded off, the possibility of jamming is decreased. In this case, guiding surfaces forming a comparatively small angle with one another may be used. However, the rule will still hold true even with rounded off edges, that, if the "rotary" and "stationary" guiding surfaces of the twisting member can be brought into alignment or parallel with one another, there will be danger of the yarn becoming jammed or sheared off between the surfaces if one tries to introduce the yarn into the twisting member rotating at a high speed.

It is generally advantageous to have the width of the open section of the bearing a multiple of that of the slit formed in the twisting member. For example, if the width of the slit is of the order 0.1 millimeter, the open section of the bearing may be one millimeter. However, it is desirable to make the slot in the bearing narrow adjacent the surface of contact of the bearing lest it interfere with the rotation.

In order positively to make the twistable material travel toward the interior of the twisting member through the cooperation of the "rotary" guiding surfaces (slit 212 or bridge 213, Fig. 6) and "stationary" guiding surface (230), it is desirable that the tangents at points of the guiding surfaces which are simultaneously in contact with the twistable material diverge toward the interior of the twisting member as viewed in the direction of the axis of the twisting member 6 (Fig. 1), at least through a part of the passage formed by the guiding surfaces during rotation, in such a manner that the inwardly directed tangent of the "rotary" guiding surface encloses the greater angle with respect to the instantaneous direction of the direction of the rotary movement at the said point. As a result of this construction, the twistable material is positively driven by the "stationary" guiding surface toward the interior of the twisting member. However, the result is not changed if for some constructional reason the guiding surfaces include one or more sections in which the twistable material is not moving inwardly, but only circumferentially or perhaps even outwardly, providing that after such movement it will continue its inward movement.

The construction of the "stationary" and of the

"rotary" guiding surfaces is also influenced by external forces acting upon the yarn.

Preferably one or more "rotary" guiding surfaces in the twisting member are inclined in a forward direction so that they cooperate with external forces acting on the yarn, such as forces resulting from ballooning of the yarn, forces exerted on the yarn by the operator holding the broken yarn end in his hand, and air resistance and inertia forces tending to make the yarn lag, to move the yarn quickly into twisting position. This action is illustrated diagrammatically in Fig. 1a which shows a single "rotary" guiding surface 1.

Figure 1A:
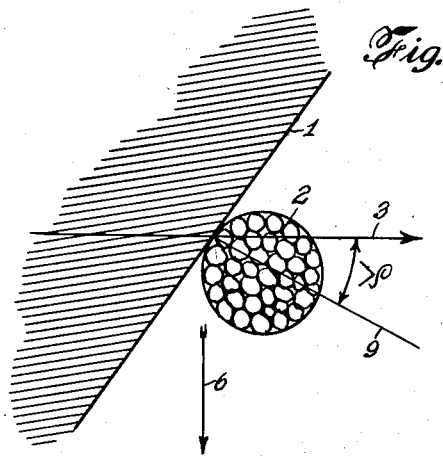
Fig. 1a is a diagrammatic view of a single rotary guiding surface.

As will be seen in Fig. 1a, spontaneous inward movement of the yarn 2 occurs if the vector 3 representing the direction of movement of the surface and the line 9 normal to the surface 1, which may correspond in this case, for example, to the surface of the slit 212 or 217, or that of the bridge 213 in Fig. 6, form an angle greater than the angle of friction and the surface 1 is inclined with reference to the direction of rotation in such a manner that the inward movement of the twistable material represents a backward movement with reference to the direction of rotation of the twisting member.

The forward inclination is particularly desirable in the slit of the twisting member through which the yarn enters the twisting member, e. g. slit 12 in Fig. 2. It is also desirable to have the leading corner of the slit rounded off in such a manner that the yarn will be caught by the rear wall surface on a sufficient area.

In order to avoid jamming of the yarn between the bearing and the twisting member after it has passed the open section of the bearing, the bearing is preferably constructed yieldingly or is formed sufficiently loose that the yarn can find room between the bearing and the twisting member. This means a clearance of a few tenths of a millimeter. To facilitate smooth entrance, the guiding surface of the bearing is preferably positioned tangentially to the journalled surface of the twisting member.

In the case of yarn simultaneously in contact with the "stationary" and "rotary" guiding surfaces, the danger of shearing is decreased by providing a yielding connection between the twisting member and the power supply. From this point of view, it is desirable to employ a drive in which the maximum torque is less than twice the normal operating torque. A drive by frictional, pneumatic or electromagnetic means is advantageous from this point of view.

By employing the above measures it is possible for the yarn to jump smoothly into the twisting member rotating at 10,000 to 15,000 revolutions per minute, even if the diameter of the journalled part of the twisting member is only a fraction, e. g. one-third, of the part of the twisting member having the maximum diameter.

With twisting members comprising parts having widely different diameters, problems arise in connection with the deposit of fiber fragments which interfere with the operation of the device. Because of this problem, the construction of the journal-like part of the twisting member supported in the bearing requires particular attention. It has been found that excessive length of the cylindrical body having a comparatively small diameter leads to difficulty in the operation of the device because broken yarn tends to become wound on the longer cylindrical portion.

To avoid this, the journalled part of smaller diameter is either constructed with a length preferably less than its diameter, or it is conically shaped. The angle of the cone should be sufficiently great that the tapered journal cannot become wedged in its bearing. In the interest of lowering the frictional resistance, as well as to avoid winding of the yarn on the bearing surface, it is desirable that the cone have an angle of opening as wide as possible. The width of the angle of the opening is limited only in that the conical contacting surface has to provide a sufficient support for the lateral forces. With a conical journal, the frictional resistance of the bearing can be reduced by blowing air between the bearing and the journal. For the purpose of preventing deposition of fiber fragments, it may be desirable not to have the bearing of the twisting member in contact with the entire surface of the supported part. From this point of view, free support between three rollers, or for example, three balls, is advantageous. Favorable results may also be obtained according to the invention by the use of a bearing having a triangular form in plan view (Fig. 8) which bearing can be made, for example, of a hard steel wire.

It is essential from the point of view of serviceability of the twisting member that the yarn having entered its cavity should readily assume the position necessary for the twisting, and should not be flung out of this position under the influence of the external forces acting upon it, i. e. the braking force of the drafting system and the stress of the ballooning. A twisting member having yarn guiding elements which provide the friction necessary for twisting the longitudinally stretched yarn, and which are preferably in the form of eyelets substantially surrounding the yarn at both the entrance and the exit, is particularly advantageous from this point of view. The eyelets are connected with the slit of the twisting member by means of guiding paths along which the yarn, lagging behind during rotation, can slip into the eyelets. Each of the guiding paths for the yarn has at least one section for preventing the movement of the yarn in the reverse direction. The parts of the surface of the twisting member which come into contact with a yarn inserted during rotation are designed in such a manner that the yarn will be caught only by the slit of the rotating twisting member and not on other parts of its surface.

In the preferred embodiments of the twisting member provision is made to permit the flying fragments which might enter the twisting member to fly out of the latter under the influence of the whirling air currents occurring in the twisting member.

Constructional embodiments of the twisting device and of the twisting member, in accordance with the invention, are shown in the drawings (Figs. 2 to 24) on a greatly enlarged scale. In practice, the diameter of the twisting member generally does not exceed 10 to 25 millimeters.

In Figs. 2 and 3 there is shown a twisting member 10 which is rotatably mounted preferably in advance of the spindle of a spinning frame. The twisting member as shown is rotated clockwise at high speed, preferably 10% to 30% higher than the speed of the spindle so that the yarn passing through it is given an increased twist between the front rollers and the twisting device as set forth in my co-pending patent application. The rim 11 of the twisting member 10 is provided with a slit 12 through which the yarn can enter the interior of the twisting member. The mouth of the slit 12 is rounded off on the side which leads with respect to the direction of rotation indicated by the arrow 21. A bridge 13 arranged at one of the front sides of the twisting member supports a journal or stud 14, which is provided with a bore 22 and a slit 17 leading to the said bore. According to the example shown in the drawing, a cross cylindrical member 19 provided with a groove 20 is arranged in the twisting member and is secured, by means of its ends of reduced diameter, in apertures formed in the band portions or strips 13a which represent extensions of the bridge 13, and is connected with the rim 11 of the twisting member by means of the said extensions.

Rectangular recesses are formed in the rim, and in these recesses are tightly positioned the extensions 13a of bridge 13. These extensions are bent upon the rim 11 at both the lower and upper sides of the rim 11, as shown in the figures, and they may also be soldered to the rim. The journal or stud 16 is connected with the bridge 15 fixed in the rim of the twisting member in a similar manner, said journal or stud being provided with a bore 23, and a slit 18 leading laterally to the bore. In order to take any axial forces, the journals 14 and 16 are provided with collars 16' and 16'', respectively, sliding on the end surfaces of the journals. The journals or studs 14 and 16 are comparatively short, so that the probability that a broken yarn coming in contact with the journal will become wound around the latter is minimized.

The slit 12 has been shown in Figs. 2 and 3 as a slit bounded by planes perpendicular to the plane of the drawing. The slit may, however, also be positioned at an angle as has been done in the cases described in the specification of my previously mentioned patent application. As the rim has a thickness in most cases of only a few millimeters, the yarn can easily jump into the slit arranged parallel to the axis. It is preferable, however, that the slit be inclined inwardly and rearwardly relative to the direction of rotation, as seen in the plan view, to insure that the yarn will be caught and moved inwardly before it can come into contact with the guiding surface of the bearing.

The slits 17 and 18 are preferably arranged in such a manner that opportunity for the yarn to get out of the bores 22 and 23 (respectively 122 and 123 in Figs. 4 and 5), is minimized as much as possible. Therefore, the slits do not lie on a line or in a plane with the slit 12. It may be advantageous also for the slits 17 and 18 to form an angle of 90° or more as seen in the axis of rotation, and further as shown in the Figs. 2 and 3, for these slits 17 and 18 to be formed obliquely to the plane of rotation of the twisting member.

The yarn entering at the slit of the rim passes to the slit of the journal through the space of clearance between the rim and the journal. The latter mentioned slit is arranged adjacent to the bridge connecting the journal with the rim in such a manner that the yarn is guided into the slit of the journal by the said bridge in cooperation with the guiding surface, i. e. the outer surface, of the bearing. Lest the yarn become jammed between the rim and the journal, it is desirable to provide between the interior wall of the rim and the outer surface of the journal, at least on the section where the yarn travels from the slit of the rim to the slit of the journal, a space of clearance having a width representing a multiple of the thickness of the yarn. This is most readily done by having the inner diameter of the rim appropriately larger than the outer diameter of the journal.

To avoid the yarn being momentarily flung out, it may be advantageous to arrange a ring 24, in the form of a partial spiral, in the bore of the journal or adjacent to it, especially at that side of the twisting member which faces the ballooning. The ring may, for instance, lie in a peripheral groove cut in the bore and have its outwardly bent end 24a engaged in an aperture 24b formed in the journal. This construction not only prevents the yarn from jumping out, but also prevents any substantial lateral oscillations of the yarn.

Figure 4:
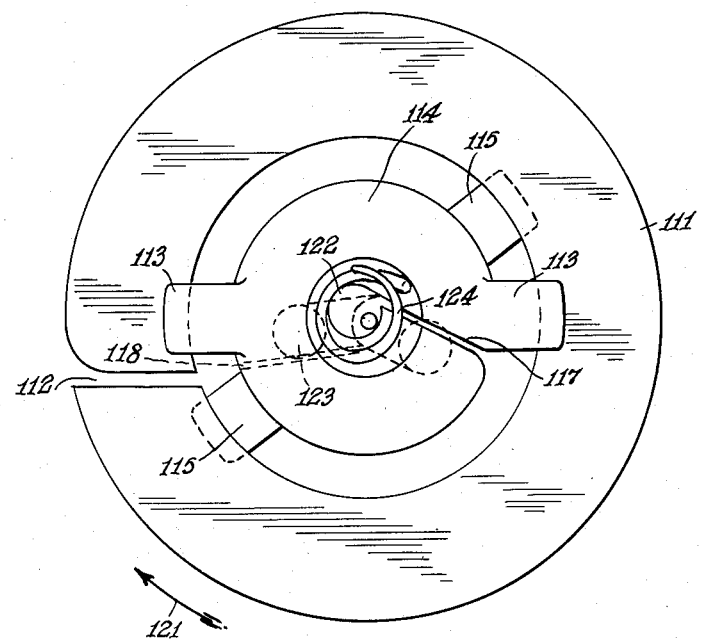
Figs. 4 and 5 are similar views of another embodiment.
Figure 5:
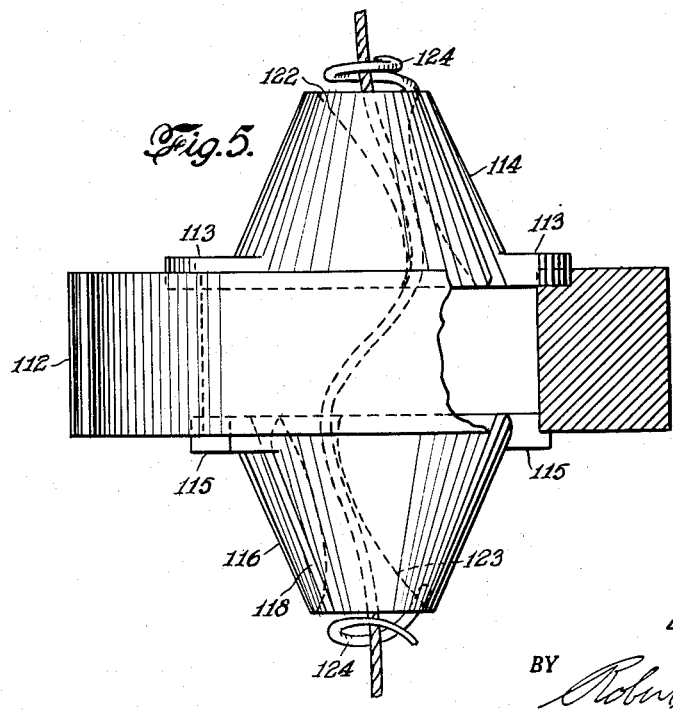

In Figs. 4 and 5, the parts have been given the same reference numerals as in Figs. 2 and 3, with 100 added.

The twisting member shown here differs from that according to Figs. 2 and 3 in that the cross cylindrical member 19 is lacking and instead of it the bores 122 and 123 of the shafts 114 and 116, respectively, are bored obliquely so that they guide the yarn in a zigzag manner.

The journals 114 and 116 are tapered in such a manner that flying yarn fragments will not become wound around them as might occur in the case of cylindrical studs. The tapered stud or journal takes up the axial forces at the same time, in such a manner that the collars 16' and 16'' shown in Fig. 3 are not necessary. In the case of the tapered journal, the jamming of the twisting member, as a result of the entry of the yarn between the bearing and the journal, is avoided by making possible the axial displacement of the twisting member within certain limits. In the case of axial displacement of the tapered journal, a corresponding space is formed between the journal and the bearing. The bridges 113 and 115 supporting the journals 114 and 116, respectively, are secured to the rim 111 in suitable recesses which are formed in the upper and lower faces of the rim, e. g. by stamping, the ends of the bridges being soldered or welded in the recesses. A similar method of securing the bridges may be employed in the case of the constructional examples according to Figs. 2 and 3. In this case the cross member 19 may, for instance, be stamped together with the rim or it may be soldered or welded into the rim. Except as otherwise shown or described, the twisting member of Figs. 4 and 5 is like that of Figs. 2 and 3.

The twisting members are, of course, constructed according to the desired methods of drive to be used. Thus, for example, in Figs. 3, 6 and 7 twisting members are shown which are provided with a groove suitable for drive by means of a cord or a round belt, while the twisting members shown in Figs. 8, 9, 11, 12 and 15 to 18 are suitable for a pneumatic drive.

In the case of the form of the twisting device shown in Figs. 6 and 7, the journals 214 and 216, respectively, arranged at the two face sides of the twisting member designed according to any of the embodiments shown in Figs. 2 to 5, are rotatably supported in the bearing 226 and 227, respectively, formed in the plates 232 and 233, respectively. The bearings are provided according to the invention with openings 228 and 229, respectively, widening outwardly in such a manner that the yarn may be easily lead to the slit 212 of the twisting member. The slots of the bearings are bounded in the direction of rotation 221 by the directing surfaces 230 and 231, respectively, which are designed, according to the principles mentioned in connection with Fig. 1, in such a manner as to lead the yarn entering into the slit of the twisting member through the said slit into the interior of the twisting member and into the slits provided in the journals of the twisting member, respectively. In view of the fact that, as already mentioned, the slits of the said journals are at an angle to one another as seen from the direction of the axis of the twisting member, it may prove advantageous for the yarn to be led simultaneously into the slit 217 of the journal 214 of the twisting member and into the slit 218 of the journal 216, respectively. For this purpose the directing surface 231 of the lower bearing is also arranged at an angle with respect to the directing surface 230 of the upper bearing. This is especially desirable when the slit 212 itself is also slanted. For other reasons, however, it may be more advantageous to have the yarn enter first the slit of one of the journals and then enter the slit of the other journal.

The right-hand end 235 of the plate 232 as viewed in Fig. 6 is bent upwardly and is provided near its upper end with recesses 236 in which the teeth 234 of the upper plate 233 mesh. The upper plate is also held in place by the leaf spring 238 kept down by the screw 237. The plate 233 may easily be removed from the plate 232 in order to permit removal of the twisting member, which may become necessary.

The plate 232 is pivotally connected with the arm 239 by means of the screw bolt 240, in such a manner that it can be pivoted about a vertical axis. The arcuate upwardly extending end 242 of the arm 241 arranged at the right-hand end of the plate 233 as shown in Fig. 6 is bent upwardly in such a manner that it serves as a bearing and presses the cord or round belt 225 against the circumferential groove of the rim of the twisting member. Thus the cord or round belt bears against the twisting member and drives it with a uniform force without the necessity of mounting or adjusting the twisting member with precision, as the plate 235 pivoting about the bolt 240 takes up a suitable position automatically under the influence of the cord guiding surface 242. The plate 232 may be stiffened by being provided with an upwardly bent rib 243.

In the case of the embodiment according to Figs. 8, 9 and 10, in which the parts have been given the same reference numerals with 300 added, blade-like elements 344, which have been shown diagrammatically as teeth of a ratchet wheel, are formed on the rim 311 of the twisting member. A current of air is directed for example by means of the nozzle 345 against the blades of the rim in such a manner that the twisting member is rotated. In order to avoid unilateral load on the bearing it is advantageous to use two nozzles which produce parallel but oppositely directed jets of air, a second nozzle being indicated at 345a. The nozzles are omitted in Fig. 9 for the sake of clarity. The twisting member is supported resiliently as shown in Figs. 8 and 10 in order to reduce the power necessary for its rotation. A resilient plate 347, e. g. a rubber sheet, is interposed between the plate 348 of the bearing 327 and the arm 346, and a rubber block 349 is positioned between plate 348 and the wire body 350 forming the bearing 326. Over the wire body 350 there is a rubber washer 351 which is pressed down by the metal washer 352 and the screw bolt 353. The wire body 350 is in contact with the supported conical journal at three points only, and is advantageous from the point of view of avoiding the deposition of fiber fragments.

The above mentioned embodiment appears at first glance not to correspond to the criterion mentioned in the introduction, viz. that on the parts of the outer surface of the twisting member which are in contact with the yarn introduced during the rotation of the twisting member, there should be no elements except the slit on which the yarn could get caught. However, those surfaces of the ratchet teeth which form a greater angle with the radial direction, and lie ahead in the direction of rotation, are sufficiently smooth, and the yarn rebounds off these surfaces and cannot get caught upon them. In certain cases and especially when yarns of a very little strength, that is yarns having a very low twist constant (twist multiple) or a very high count, are spun, it may be desirable to surround the blade wheel with one or more circular ribs or rings 311b which do not interfere with the air current.

The twisting devices illustrated in the preceding figures are provided with twisting members supported at both sides.

As upward directed forces never act upon the twisting member, the upper bearing merely plays the part of a lateral support, but even that part is subordinate since the components directed upwardly as viewed in the top plan view of the device may be for the most part equalized by the pressure of the air streaming from the nozzle 345 or that of the belt or cord 225.

Figure 11:
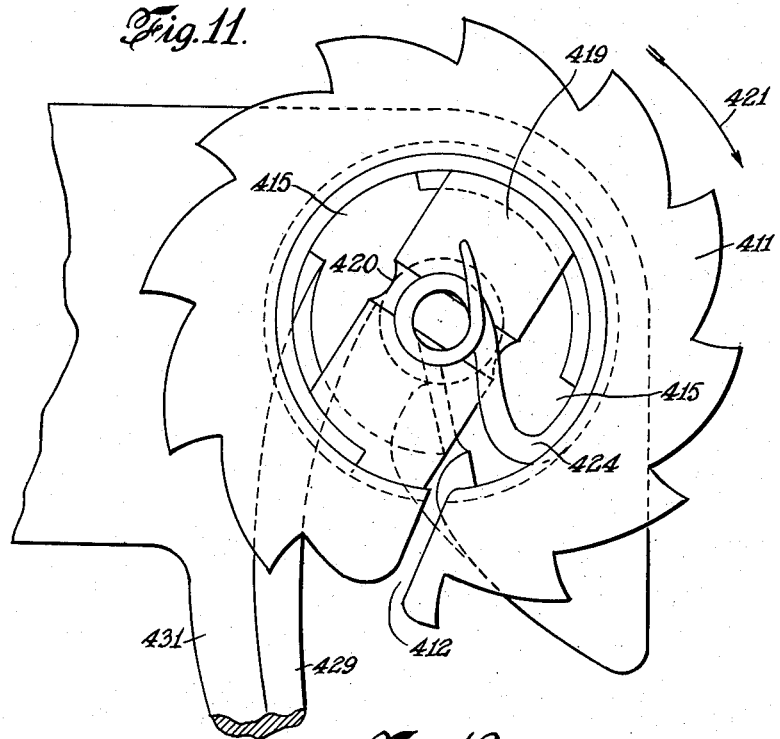
Figs. 11 and 12 show in plan and side elevation, respectively, a constructional example of the twisting member having only one journal, and a twisting device provided with such a twisting member, respectively, in top plan view and partially sectional side elevation, respectively.

Figs. 11 and 12, in which the parts have been given the same reference numerals with 400 added, show a twisting device wherein the upper journal 214 of the twisting member and the bearing 226 are absent and the bore 122, as well as the slit 217, are replaced by a central yarn guiding eyelet 424, formed of bent wire.

The manner of securing the lower journal 416 of the twisting member in this embodiment corresponds to the construction illustrated in Figs. 4 and 5. The journal has, however, an axial bore as shown in the drawing, while in the rim 411 of the twisting member there is a cross member 419 similar to that in Figs. 2 and 3 which may be stamped together with the rim. The twisting member of Fig. 11, like that of Fig. 8, is adapted for pneumatic drive.

In the twisting device shown in Figs. 13 and 14, in which the parts have been given the same reference numerals with 500 added, the twisting members are driven, according to a method described in the specification of my already mentioned patent application Serial No. 991, by discs 558 driven by friction wheels 557 secured to a common transmission shaft 556. The tire 559 of the disc 558, made of material having an adequate friction, for example rubber, makes contact with the surface 560 of the rim 511 of the twisting member, which rim is preferably roughed as shown.

The bearing 527 of the twisting member is arranged in the arm 561 which is pivoted to the plate 562 by means of the screw bolt 563. Plate 562 also supports the journal of the disc 558. The weak helical spring 564 acting upon the arm 561 presses the surface 560 of the twisting member against the tire 559 of the disc 558 with a force sufficient only to keep the twisting member in rotation during its idle run and the threading in. During operation the action of the spring 564 is increased by the horizontal component of the stress of the yarn 565 whose order corresponds to the order of the force necessary to keep the twisting member in rotation.

Contact between the disc 553 and the friction wheel 557 is maintained by the leaf spring 566 which is mounted on the plate 568 which is secured by means of the screw 567 to the frame of the spinning frame and presses the projection 569 of the plate 562 into the corresponding recesses of the plate 568. The plate 562 is pivoted at 562a.

An advantage of a twisting member having only one journal lies in its extraordinary simplicity and in the ease with which the twisting member may be removed for cleaning; its shortcoming is a less favorable bearing support.

In the case of the twisting members having only one journal, it is also advantageous to form the guiding eyelet at the end of the journal as a partly helical ring.

Figs. 15 to 18, in which the parts have been given the same reference numerals with 600 added, show a form of the twisting device provided with a pneumatic drive, the air resistance of which is less, and the bearing resistance of which is very favorable because of the fact that the twisting member is supported practically with a free axis.

On the front wall of the air channel 681 there is arranged a shield 682 and a nozzle 683 is tightly secured in the shield. The tapered end of the nozzle 683 fits into the complementary conical bore 687 in the block 686 which is pivotable about the axis 685 arranged in the arms 684 of the shield 682. The injector effect of the air streaming out of the nozzle 683 into the bore 687 assists in preventing escape of air.

The bore 687 of the block 686 is continued in the nozzle 688, the latter being arranged in such a manner that the air jet streaming out of the nozzle strikes the surfaces of blade 689 formed in the rim 611 of the twisting member. In order to make the air resistance more favorable, the blades 689 are not formed as simple teeth, as for example in the constructional form according to the Figs. 8, 9 or 12, but as cylindrical recesses having their axes arranged in a plane perpendicular to the axis of the twisting member.

The bearings of the twisting member are formed in this case by the metal strips 690 and 691, which metal strips are positioned in the cavities 692 and 693, respectively, of the block 686, the cavities have an oblong shaped cross-section, and the strips are fixed in the cavities in such a manner that they have a clearance both longitudinally and laterally of the order of the amplitude of the possible oscillations or movement of precession (meaning the movement of the free axis of a gyroscope describing a cone) appearing on the axis of the twisting member, so that the twisting member rotates practically as a gyroscope having a free axis. As is known, the energy necessary for driving a gyroscope having a free axis is comparatively small. Instead of the plates 690 and 691, respectively, the bearings may be formed in the manner shown in Fig. 8, viz. of wire bodies positioned with similar lateral and longitudinal clearance.

The twisting member itself differs from the twisting members shown in Figs. 2 to 5, chiefly in that the intermediate cross support 695 is formed integrally with the upper bridge 613, the groove 696 of the cross support 695 being adapted to keep the yarn in the middle, as is the circular groove 20 of the member 19 in the case of the twisting member shown in Figs. 2 and 3.

The journals 614 and 616 of the twisting member are cylindrical, but are sufficiently short that the danger of broken yarn being wound around them is minimized.

The slit 612 of the twisting member is formed in accordance with this constructional embodiment obliquely in such manner that the lower end of the slit is the leading end from the point of view of the direction of rotation. This end is preferably rounded off in such manner that the yarn will easily enter into the slit 612.

The slits 617 and 618 formed in the journals 614 and 616, respectively, are similarly arranged obliquely in such a manner that the yarn, entering through the slit 612 and lagging behind will slip along them into the yarn guiding eyelets 622 and 623, respectively, arranged at the two ends of the twisting member. The inclination of the slits 617 and 618 is so great that the journals 614 and 616, respectively, are obliquely slotted so that the yarn has to form a substantial angle with the axis of the twisting member, to permit it to step out of the yarn guiding eyelets 622 and 623, respectively, into the corresponding slit. This angle is greater than the angle occurring in practice as determined by the position of the yarn coming from the drafting rollers and by the angle of the opening of the ballooning. For this reason it is desirable to arrange the twisting member so that its axis will take up a position bisecting the angle included between the axis of the ring spindle and the direction of the yarn coming from the drafting system.

Further, the twisting member is designed in such a manner that the flying dust or other fragments can leave it freely. This may be aided by providing openings at certain places in the rim, which lead toward the interior of the twisting member and allow the driving air current to enter the interior of the twisting member.

Figs. 19 and 20, in which the parts have been given the same reference numerals with 700 added, show an electromagnetically driven twisting device. The parts which secure the twisting device are, for convenience of illustration, omitted in both figures.

The twisting member is driven in this case by a rotary magnetic field perpendicular to and rotating around the axis of the twisting member, the rotary magnetic field being produced by the action of the three-phase windings 802, 803 and 804 arranged on the laminated core 801. Under the influence of the magnetic rotary field, eddy currents appear in the rim 711 of the twisting member in such a manner that it is operated like a cage rotor. As is known, in the case of such an arrangement the easily rotatable rotor rotates, with a certain slip, at a number of revolutions corresponding to that of the rotary magnetic field. Thus, for instance, in order for the twisting member to make about 10,000 revolutions per minute, rotary current of about 200 cycles is necessary, according to the arrangement as shown. The production of such a current is readily effected by known means.

Figure 18:
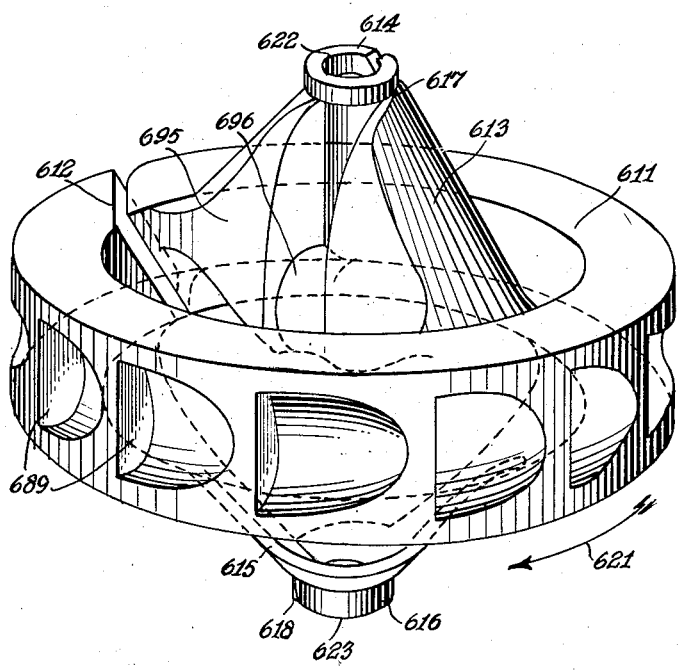
Fig. 18 shows the twisting member in a perspective view on an enlarged scale.

The twisting member has a construction similar to that of the twisting member as shown in Fig. 18 except that there are no blade surfaces in the rim of the former. The bearing arrangement of this twisting member is also similar to that shown in Figs. 16 and 17. In this case the metal bearing strip 791 is arranged in the block 805, preferably made of an insulating material and secured to the laminated iron core together with the insulating block 806 by means of the screw bolt 807. The metal strip 791 is fixed in the cavity 793 of the block 805 by means of the end of the screw bolt. The upper metal strip 790 is fixed with adequate clearance in the cavity 792 formed between the blocks 806 and 808 by the studs 809 and 810 projecting from the block 808 made of a heavy metal, e. g. a lead composition. The rim 711 of the twisting member is preferably made of iron or some other ferro-magnetic material. In this case the elements, e. g. 16' and 16'' (see Fig. 3) securing the twisting member against axial displacement may be dispensed with as the twisting member is automatically adjusted at the middle by the magnetic field.

The block 808 being arranged in such manner that it can be removed, the twisting member may be taken out vertically from between the poles of the iron core without any difficulty.

The proportioning of the winding on the iron core is such that it can be operated with a rotary current of a voltage preferably not exceeding 10 volts, e. g. 6 volts, lest the driving circuit of the twisting members cause a dangerous electric shock as a result of any defect of the coils or of the other conductors.

In order to permit the insertion of the yarn, the pole 811 of the iron core 801 has been slotted in such a manner that the yarn can be introduced through the slot 812 to the slit 712 formed in the rim 711 of the twisting member. The slotting of the iron core at one of the poles is advantageous as it interrupts the magnetic circuit comparatively little because the coils are arranged on the other parts of the core.

The iron core 801 may be pivotally arranged, in the manner shown for example in Figs. 15 and 16, and electric contacting means may be provided which close the circuit only when the twisting device is in operative position.

The electrodynamic drive has been described above in connection with a three-phase winding. It will be understood, however, that the invention is not limited to the use of three-phase current in producing an electromagnetic force to rotate the twisting member.

The advantage of the above described construction with a rotary magnetic field is that the torsion moment acting upon the twisting member increases with the slip to the magnetic field, in such a manner that the rotation of the twisting member corresponds within practical limits to the number of revolutions determined by the number of cycles per second.

Figs. 21 to 24, in which the parts have been given the same reference numerals with 900 added, show another constructional form of the twisting member. In this case the elements corresponding to the bridges 13 and 15 of Fig. 3 have been formed of the material of the rim 911 of the twisting member, viz. beside the bore 1021 there is provided a groove 1022, and, as the case may be, a second groove 1023, said grooves being comparatively broad with reference to the size of the twisting member, and may be obliquely positioned. The oblique slit 912 of the twisting member opens into the groove 1022. The journals 914 and 916, as well as the cross support 919, are formed of one piece of tube 1024, wedge-shaped cuts or recesses 1025, 1026, shown in the figure being cut, filed or ground into the tube. In order to avoid accumulation of fiber dust, similar openings 1025' and 1026' are provided on the opposite side of the tube, through which the flying dust or fragments may fly out under the influence of centrifugal force.

The tube 1024 may be secured in the bore 1021 of the rim 911 by soldering or welding. To accommodate the solder, the rim of the twisting member is beveled along the surfaces indicated by 1027. As shown, the shoulders 916' and 916'' have also been formed of the material of the rim, said shoulders serving to hinder the axial displacement of the twisting member.

From the corners of the recesses 1025 and 1026, respectively, which trail in the direction of rotation, begin the preferably oblique slits 917, 918 which go through the wall of the tube 1024. The yarn may jump during rotation through these slits into the interior of the tube while the yarn stretches against the part 1024.

The edges which come in contact with the yarn are preferably rounded off lest they wear the yarn and lead to fiber dust formation.

In order further to decrease dust formation, recess 1028 or 1029, respectively, may be formed at the mouths of the grooves 1022, thereby facilitating the elimination of dust or fragments. To balance the twisting member, similar recesses 1028' and 1029' are formed opposite recesses 1028 and 1029. If the twisting member is designed for pneumatic drive, it may be advantageous to permit the driving air current to penetrate through the recesses into the interior of the twisting member and thus take part in its cleaning.

In the case of the last mentioned constructional form, as well as in the case of those shown in the previous figures, it is not necessary to form the rim by means of a chipping operation. It may be molded by pressure die casting or stamping. In the case of the constructional form according to Figs. 21 to 24, the tube 1024 is made of a hard, wear-resistant steel which may be subjected to a heat treatment after its shaping. During the soldering or welding operation necessary for uniting the tube with the rim 911, care is to be taken not to soften the material of the journals 914 and 916 and thus decrease its wear-resistant qualities.

The tube 1024 may also be secured resiliently in the rim 911. For that purpose the rim is forced wider by means of a wedge pressed into the slit 912, and the tube brought in position. In view of the fact that the tube forms a closed ring at its section forming the cross support 919 and is made of steel, it can stand the pressure of the rim 911. Mechanical fastening means such as a key, or a laterally inserted screw may also be provided.

It is obvious from the very numerous constructional examples described above that those skilled in the art may make many modifications within the scope of the invention which may be advantageous from certain points of view, particularly from the standpoint of mass production.

In this connection it may be mentioned that in the twisting member according to Figs. 21 to 24, the bridge-shaped connecting parts between the rim and the journal portions are quite rudimentary, as the essence of the invention does not lie in those parts but rather in providing the yarn with a free passage to the yarn guiding eyelets and other organs of the twisting member and making provision for it to run the said paths during and owing to the rotation of the twisting member.

What I claim and desire to secure by Letters Patent is:

1. A twisting device, comprising a rotary twisting member having an axially extending passageway, a lateral slit extending from said passageway to the periphery of the twisting member and zones of substantially different diameters, bearing means for the said twisting member having at least one open section and supporting the twisting member at at least one zone of lesser diameter, and driving means for rotating said twisting member, said device further comprising at least one means providing a guiding surface relative to which the twisting member rotates, said surface being inclined inwardly toward said passageway and positioned to direct the material to be twisted toward the open section of the bearing and to engage said material when carried around by the slit of the rotating twisting member at the farthest position of the material from the axis of the latter, the said guiding surface and the surface of said slit of the twisting member forming a passage through which the laterally introduced twistable material can travel from the outer periphery of the twisting member to said passageway during the rotation of the twisting member, the outer surface of the twisting member being free from material retaining elements whereby only the lateral slit is adapted to engage and drive the twistable material around with it in the prescribed direction of rotation of the twisting member, so that the twistable material can be introduced at any point of its length, laterally, without threading in a yarn's end, into the rotating twisting member.

2. A twisting device as claimed in claim 1, wherein the said guiding surface leading to the open section of the bearing and the said guiding surface of the rotary twisting member are non-alignably disposed relative to one another.

3. A twisting device as claimed in claim 1, wherein the said bearing of the twisting member includes at least one roller rotating around a stationary axis, the bounding surface of the said roller forming part of the guiding surface leading to the open section of the said bearing.

4. A twisting device as claimed in claim 1, wherein the contact between the said bearing and the said twisting member is yielding, allowing a clearance of the order of the thickness of the twistable material, for the passage of the latter.

5. A twisting device as claimed in claim 1, wherein the said driving means is disposed adjacent to a zone of large diameter of the twisting member and applies a driving force acting at a larger diameter on the twisting member than the frictional resistance.

6. A twisting device as claimed in claim 1, wherein the said driving means is yieldingly connected to the twisting member and arranged in such a manner that the driving force acts at a larger diameter on the twisting member than the frictional resistance.

7. A twisting device as claimed in claim 1, wherein the said driving means comprises a frictional driving means engaging the twisting member at a zone of larger diameter.

8. A twisting device as claimed in claim 1, comprising frictional driving means consisting of a flexible driving element in contact at the same time with several twisting members at a zone of larger diameter, and guiding means for keeping the said flexible element in permanent contact with the said twisting members.

9. A twisting device as claimed in claim 1, wherein the said driving means comprises pneumatic driving means which acts on the twisting member at a zone of larger diameter.

10. A twisting device as claimed in claim 1, wherein the twisting member is further provided with means adapted to rotate the said twisting member under the influence of a current of a driving fluid, stationary means being provided for directing a current of such a fluid against the said first-named means of the twisting member, the last mentioned means being arranged in such a manner that the driving force acts upon the twisting member on a larger diameter than the frictional resistance.

11. A twisting device as claimed in claim 1, further comprising blade-like means on the periphery of a zone of a larger diameter of the twisting member and stationary means for directing a current of gaseous substance against the said blade-like means provided on the twisting member.

12. A twisting device as claimed in claim 1, wherein the said driving means are arranged in such a manner that the driving force acts at a larger diameter on the twisting member than the frictional resistance, comprising electromagnetic driving means.

13. A twisting device as claimed in claim 1, comprising electrodynamic driving means consisting of a stator provided with a winding adapted to bring about a rotary magnetic field transverse to the axis of rotation of the twisting member and rotating around the said axis, the twisting member comprising a zone of a larger diameter of conducting material which is arranged to be crossed by the said rotary magnetic field, the said stator being provided with a slot forming a passage for the twistable material to the rotating twisting member.

14. A twisting device as claimed in claim 1, comprising driving means acting through a medium upon the twisting member at a zone of larger diameter and bearing means at both ends of the twisting member, at least one bearing means being secured loosely to a stationary support, whereby to have a play corresponding to the amplitudes of oscillations of the axis of the twisting member, said bearing having so little mass as to be able to follow the said oscillations.

15. A twisting device as claimed in claim 1, wherein the contact between the said bearing and the said twisting member is sufficiently yielding to permit a clearance of the order of the thickness of the twistable material for the passage of the latter, said bearing comprising a non-circular cavity and making contact with the journalled zone of the twisting member only at a few points on its periphery.

16. A twisting device as claimed in claim 15, wherein said bearing consists of a wire bent in a triangular form.

17. A twisting member adapted to be used with the twisting device as defined in claim 1, comprising zones having different diameters, at least one zone of a lesser diameter being constructed as a journal, and all the zones being provided with lateral slits for the introduction of the twistable material, means in the twisting member for frictional engagement with the yarn, means forming guiding paths leading from the said slits to the said first-named means and forming an unobstructed passage for the introduction of the twistable material, the said guiding path means and the said first-named means in frictional engagement with the twistable material being relatively disposed to prevent a substantial outward displacement of the twistable material from its twisting position, the lateral slits being the only elements on the outer surface of the twisting member which are adapted to engage and drive with the twistable material at least in one direction of rotation.

18. A twisting member as claimed in claim 17, comprising means providing guiding surfaces forming part of the said guiding path means, sufficiently inclined with reference to the direction of rotation in such a manner that the inward movement of the twistable material corresponds to a backward movement with reference to the said direction of rotation.

19. A twisting member as claimed in claim 17, further comprising means adapted to rotate the said twisting member under the influence of a current of a driving fluid.

20. A twisting member as claimed in claim 19, further comprising blade-like members on the periphery of a zone of larger diameter adapted to cause the said twisting member to rotate under the influence of said current of a driving fluid.

21. A twisting member adapted to be used with a twisting device as defined in claim 1, comprising zones having different diameters, at least one zone of a lesser diameter being constructed as a journal, and all the zones being provided with lateral slits for the introduction of the twistable material, said twisting member further comprising two yarn guiding eyelets located at both its ends and a third guiding support located between the said eyelets, the eyelets and guiding support being arranged in such manner that the lines connecting the points at which the eyelets and the third support engage the yarn form a broken line whereby the twistable material is guided in an undulating path, at least one of the said eyelets being formed as a bore in a journal-like zone of the twisting member, guiding paths, formed at least in part by the said slits, leading to the said eyelets and forming an unobstructed passage for the inward movement of the twistable material, said guiding paths being arranged relative to the said eyelets to prevent substantial outward displacement of the twistable material from its twisting position, under normal twisting conditions, the lateral slits being the only elements on the outer surface of the twisting member which are adapted to engage and drive with the twistable material at least in one direction of rotation.

22. A twisting member as claimed in claim 21, wherein the surfaces of the guiding path determining the position of the twistable material are located at the entrance of the guiding path into the corresponding eyelet in a manner to compel the twistable material to enclose a substantial angle with the axis of the twisting member.

EDE HEGEDÜS.

No references cited.